United States Patent [19]

Welling et al.

[11] Patent Number: 5,371,594
[45] Date of Patent: Dec. 6, 1994

[54] SAMPLE AND HOLD FLYBACK PHASE CONTROL CIRCUIT FOR A NULL SEKING FIBER OPTIC GYROSCOPE

[75] Inventors: Peter Welling, Melrose; Paul Ward, Waltham, both of Mass.

[73] Assignee: The Charles Stark Draper Laboratory, Inc., Cambridge, Mass.

[21] Appl. No.: 7,670

[22] Filed: Jan. 22, 1993

[51] Int. Cl.5 .............................................. G01C 19/72
[52] U.S. Cl. ...................................................... 356/350
[58] Field of Search .................. 356/350, 345; 385/12, 385/14

[56] References Cited

FOREIGN PATENT DOCUMENTS 0427110 5/1991 European Pat. Off. ............ 356/350

OTHER PUBLICATIONS

"Double closed loop Hybred Fiber Gyroscope Using Digital Phase Ramp", Lefevre et al. Aug. 1988, pp. 1–4.

Primary Examiner—Samuel A. Turner
Attorney, Agent, or Firm—Joseph S. Iandiorio

[57] ABSTRACT

A flyback phase control circuit for a null seeking fiber optic gyroscope system having an optimal peak phase amplitude includes a sample and hold circuit for sampling the phase difference between the clockwise and counterclockwise optical beams in the differential flyback period; and a compensation circuit responsive to the sampled phase difference for driving the nulling phase modulator voltage ramp generator to maintain the predetermined optimal peak phase amplitude.

16 Claims, 6 Drawing Sheets

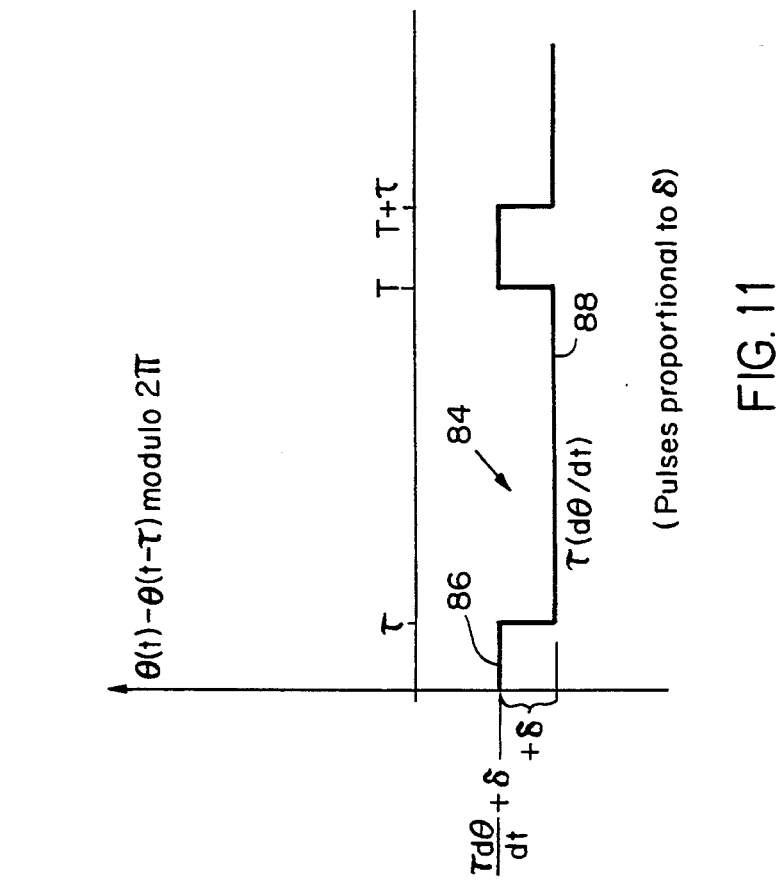
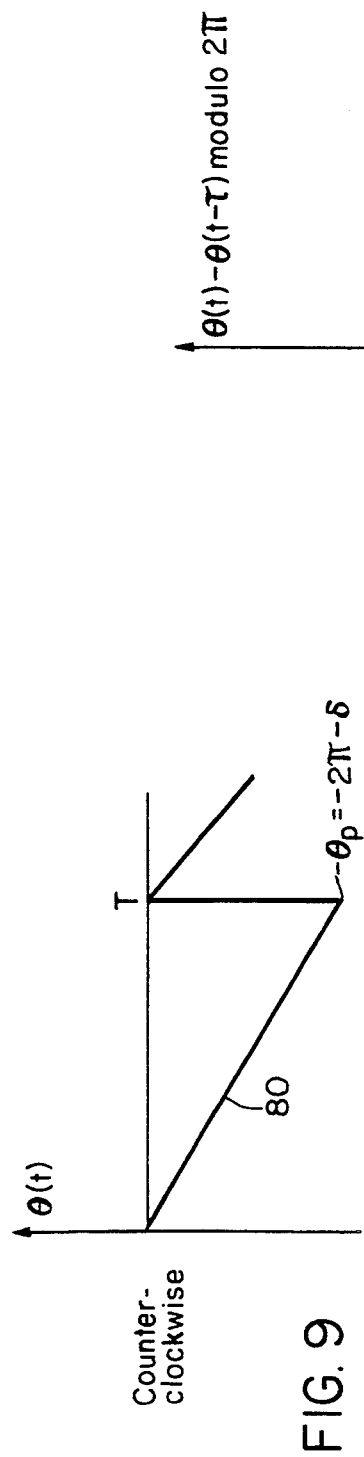
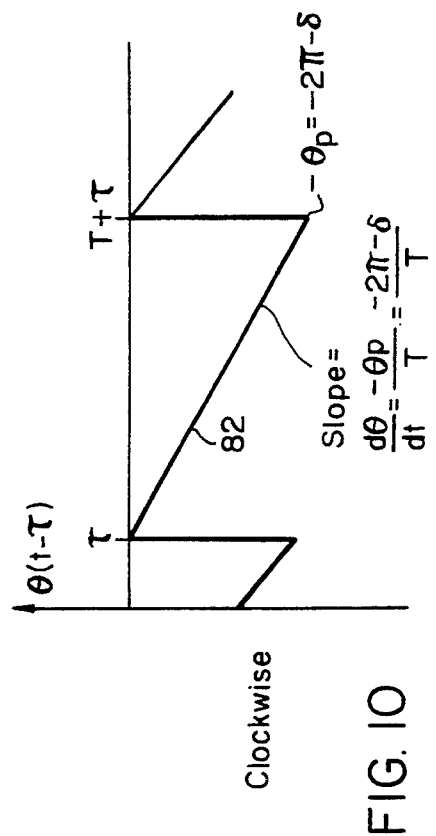
FIG. 9
FIG. 10
FIG. 11

SAMPLE AND HOLD FLYBACK PHASE CONTROL CIRCUIT FOR A NULL SEEKING FIBER OPTIC GYROSCOPE

FIELD OF INVENTION

This invention relates to a flyback phase control circuit adaptable for use in a null seeking fiber optic gyroscope system having an optimal peak phase amplitude, and more particularly to a flyback null seeking fiber optic gyroscope system utilizing such a control circuit.

BACKGROUND OF INVENTION

Fiber optic gyroscopes employing the Sagnac effect to sense inertial rotation are well known. The inertial rotation induces a phase shift between two optical beams. The amount of phase shift is sensed by a photodetector, which provides a measurement of the inertial rotation rate. Designers of precision gyroscopes desire a method to induce electronically a phase shift between the two optical beams which is equal and opposite to the phase shift induced by the inertial rotation. The net phase shift sensed by the photodetector is then zero, and its output can be monitored with high gain amplifiers without concern for saturating the electronics. The amount of electronically induced phase shift required to null the photodetector output becomes the measurement of inertial rotation.

A common procedure to introduce an optical phase shift is for the electronics to produce a ramp voltage which is converted by a transducer to a ramp optical phase at one point within the fiber optic gyro. One optical beam will be modulated by the ramp before passing through the fiber optic ring; the other beam will be modulated after passing through the fiber optic ring. When the phases of the two optical beams are compared at the photodetector, one beam will contain the value of the phase ramp delayed in time with respect to the other beam. The time delay is the time, $\tau$, required for light to travel though the fiber optic ring, typically a few microseconds. The optical phase shift, $\phi$, is the slope of the ramp phase multiplied by the time delay, $\tau$. By adjusting the slope of the ramp, the electronics can introduce a range of desired phase shifts and null the phase shift induced by the inertial rotation. The slope of the ramp is proportional to the inertial rate.

There is an obvious drawback to applying the ramp phase: The phase is proportional to the applied voltage, so the voltage would have to grow without bound, which is impractical. To circumvent this problem, the electronics will drive the ramp in voltage rapidly back to zero when the voltage reaches a certain level. The ramp immediately begins again. Hence, the voltage will produce a ramp of the appropriate slope almost all of the time, interspersed with rapid flybacks.

One problem that arises is at what voltage level the flyback to zero should be initiated. Preferably when the voltage reaches a level which corresponds to phase shift of $2\pi$ radians, flyback should occur. The phase shift observed by the photodetector is contained within a trigonometric function and thus steps of $2\pi$ radians do not change the output of the photodetector. Specifying the exact voltage level which corresponds to $2\pi$ radians is problematical. While the gain of the transducer, in radians/volts, is known approximately, it can drift with time and temperature. Also, the gain of the transducers in different gyros will be slightly different. There is another practical complication: the flyback will always require some small but non-zero amount of time. The slope of the ramp is the critical quantity. To maintain the proper slope while allowing a small time for flyback, the voltage must flyback at a level slightly before reaching $2\pi$ radians, so that it begins the next ramp at zero radians right at the time it would have reached a height of $2\pi$ radians. In addition, as the slope of the ramp changes in response to changes in the rate of inertial rotation, the voltage level at which flyback should occur changes slightly.

Various techniques have been developed to address this problem. One approach uses a complex scheme for applying squarewave modulation of the optical beam. The amplitude of the modulation is switched between two levels depending on the height of the phase ramp. The squarewave modulation and the phase ramp are combined in the electronics so that a staircase of phase, rather than a continuous analog ramp, is applied to the optical beam. By adding some amplifiers to the basic control circuitry it is suggested that a means of adjusting the peak voltage level of the ramp to the proper value is achieve.

In another approach additional optics and one or more additional photodetectors are included in the fiber optic gyroscope. The optics are positioned to allow measurement of the phase shift induced by the ramp of phase in isolation from other phase shifts. The ramp of phase generates a sinusoid output from the photodetector. When the sinusoid has completed one full cycle, the height of the ramp is known to be $2\pi$ and flyback is initiated.

Another scheme uses the high frequency phase modulation present in all precision fiber optic gyroscopes. The optical beams are typically phase modulated by a sinusoid of frequency $f_m$ to increase the sensitivity of the photodetector output to the phase shifts induced by the inertial rotation. The signal is then demodulated at $f_m$ to recover a voltage proportional to the net phase shift: the phase shift due to inertial rotation added to the phase shift due to the applied phase ramp. The phase modulator is calibrated by demodulating the output of the photodetector at $2f_m$ and adjusting the amplitude of the sinusoidal phase modulation until the signal at the output of the demodulator at $2f_m$ is driven to null. This will happen only if the amplitude of the sinusoid modulation is at a precise value, approximately 2.57 radians. Therefore, a means is provided for continuous measurement of the gain of the optical transducer, in radians/volt. If the same transducer is used for the phase ramp, then the electronics can scale the voltage required to produce 2.57 radians up to the voltage required to produce $2\pi$ radians. When the voltage ramp reaches this level, flyback is initiated.

SUMMARY OF INVENTION

It is therefore an object of this invention to provide an improved flyback phase control circuit.

It is a further object of this invention to provide such an improved flyback phase control circuit for use in a null seeking fiber optic gyroscope system having a predetermined optimal peak phase amplitude.

It is more generally an object of this invention to provide a flyback compensated null seeking fiber optic gyroscope system.

It is a further object of this invention to provide such an improved flyback phase control circuit which provides a direct measurement of the phase error of the ramp peak amplitude.

It is a further object of this invention to provide such an improved flyback phase control circuit which can be employed using separate periodic and phase modulators or one modulator which combines both the periodic and ramp phase modulation functions.

It is a further object of this invention to provide such an improved flyback phase control circuit which requires fewer electronic and optical components.

It is a further object of this invention to provide such an improved flyback phase control circuit which automatically corrects for variations in the optimal peak phase amplitude as a function of the inertial rate of the gyroscope and non-zero flyback time.

It is a further object of this invention to provide such an improved flyback phase control circuit which assures that error signals occurring during the differential flyback period do not saturate the electronic circuit.

The invention results from the realization that truly accurate flyback timing can be achieved by measuring the error in the peak phase amplitude during the period between the two optical beam ramp flybacks and using that measurement to feed back a correction signal to the ramp generator so that the optimal peak phase amplitude is always maintained even though the modulator gain may drift due to temperature, aging, stress or other environmental conditions.

This invention features a flyback phase control circuit for a null seeking fiber optic gyroscope system having an optimal peak phase amplitude. There is a sample and hold circuit for sampling the phase difference between the clockwise and counterclockwise optimal beams in the differential flyback period, and a compensation circuit responsive to the sampled phase difference for driving the nulling phase modulator voltage ramp generator to maintain the predetermined optimal peak phase amplitude.

In a preferred embodiment the compensation circuit may include an automatic gain control circuit and an integrator circuit responsive to the automatic gain control circuit. The automatic gain control circuit may include an inverter circuit and means for interconnecting the inverter circuit with the sample and hold circuit when the ramp is of one polarity and disconnecting it when the ramp is of the other polarity. The automatic gain control circuit may include switching means for setting the input of the integrator to zero when a flyback has not occurred for a predetermined period of time. The gyroscope may be an interferometric fiber optic gyroscope.

The invention also features a flyback compensated null seeking fiber optic gyroscope system having a light source, a fiber optic ring, and means responsive to the light source for producing a clockwise and counterclockwise light beam in the ring. There are means for detecting the phase difference between the clockwise and counterclockwise light beams and means for periodically modulating the phase of the light beams and for modulating the phase difference between the clockwise and counterclockwise light beams. Ramp generator means, responsive to the means for detecting the phase difference, generates a ramp signal having predetermined optimal peak phase amplitude for adjusting the means for modulating to cancel the phase difference between the clockwise and counterclockwise beams induced by rotation of the ring. There is a flyback phase control circuit which includes a sample and hold circuit for sampling the phase difference between the clockwise and counterclockwise light beams in the differential flyback period of the ramp signal, and a compensation circuit responsive to the sampled phase difference for driving the ramp generator means to maintain the optimal peak phase amplitude.

In a preferred embodiment the light source may be a laser, and the means for providing the clockwise and counterclockwise light beams may include a Y junction. The means for detecting the phase difference may include a photodetector and may also include a lock-in amplifier. The lock-in amplifier may include a bandpass filter, an amplifier and a demodulator. The ramp generator means may include a voltage ramp generator. The compensation circuit may include an automatic gain control circuit and an integrator circuit responsive to the automatic gain control circuit. The automatic gain control circuit may include an inverter circuit and means for interconnecting the inverter circuit with the sample and hold circuit when the ramp is of one polarity and disconnecting it when the ramp is of the other polarity. The automatic gain control circuit may include switching means for setting the input of the integrator to zero when a flyback has not occurred for a predetermined period of time. The gyroscope may be an interferometric fiber optic gyroscope.

DISCLOSURE OF PREFERRED EMBODIMENT

Other objects, features and advantages will occur to those skilled in the art from the following description of a preferred embodiment and the accompanying drawings, in which:

FIG. 9 is an illustration of a negative-going optical phase ramp waveform of the counterclockwise beam of FIG. 1 having a peak phase amplitude of $-2\pi$ minus the error of $\delta$;

FIG. 10 is a view similar to FIG. 9 of the negative-going optical phase ramp waveform of the clockwise beam of FIG. 1 having a peak phase amplitude of $-2\pi$ minus $\delta$;

FIG. 11 is an illustration of a waveform showing the difference between the waveforms of FIG. 9 and FIG. 10.

Figure 1:
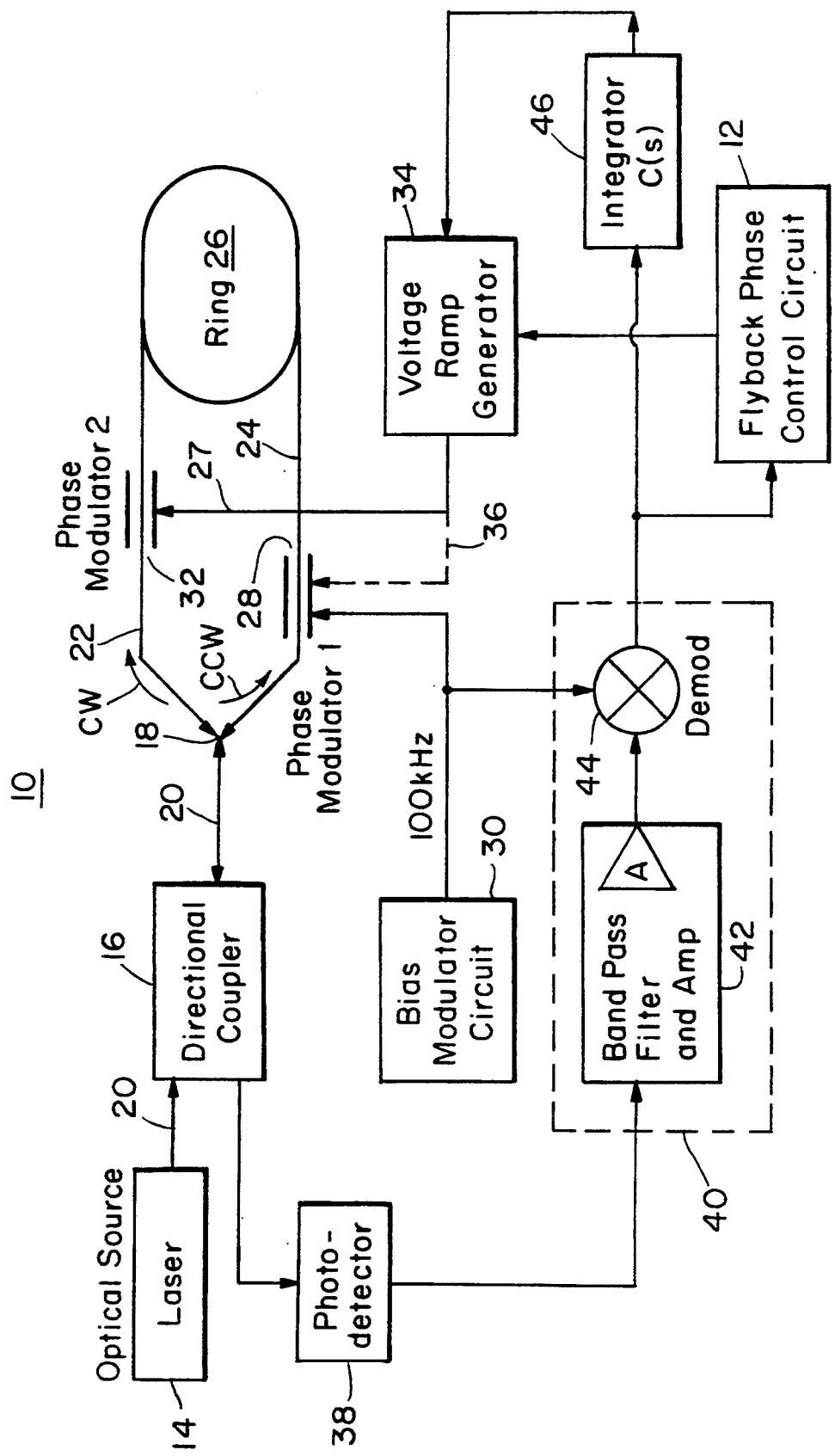
FIG. 1 is a schematic block diagram of a flyback compensated null seeking fiber optic gyroscope system employing the flyback phase control circuit according to this invention.

There is shown in FIG. 1 a null seeking fiber optic gyroscope system 10 including the flyback phase control circuit 12 according to this invention. The null seeking fiber optic gyroscope system 10 includes an optical source such as a laser 14 which is coupled through a directional coupler 16 to "Y" junction 18 that splits the beam 20 derived from laser 14 and passing through coupler 16 into two components: a clockwise fiber optic leg 22 and a counterclockwise fiber optic leg 24. These legs terminate in fiber optic ring 26 which is approximately a kilometer in length and has a transit time $\tau$ of approximately 5 microseconds. A modulator crystal such as lithium niobate waveguide modulator 28 provides a periodic modulation such as a sinusoidal, squarewave, or other periodic function of the light beam as it passes through counterclockwise leg 24. Waveguide modulator 28 is driven by bias modulator circuit 30 typically at a frequency whose period is twice the ring transit time $\tau$. In this case the frequency is approximately 100 KHz. A second modulator, phase nulling modulator 32, is disposed on clockwise leg 22. It is driven by a voltage from voltage ramp generator 34. Modulator 32 may also be made from a lithium niobate crystal. Although in some prior art devices modulators 28 and 32 must be separate components, this is not a limitation of this invention as they may be separate as shown, or modulator 28 may perform the function of both modulators 28 and 32 as indicated by the dashed line input 36 from voltage ramp generator 34. Photodetector 38 senses any phase difference in the clockwise and counterclockwise beams and provides an output representative thereof to lock-in amplifier 40, which includes bandpass filter 42 and demodulator 44 which receives one input from bandpass filter 42 and a second from the bias modulator circuit 30. Bandpass filter 42 actually includes a filter network and an amplifier as is well known in the art. Demodulator 44 beats the two inputs and provides a demodulated output to integrator circuit 46 and also to flyback phase control circuit 12.

In operation, ignoring for the moment flyback phase control circuit 12, with ring 26 stationary, the 100 KHz modulated clockwise and counterclockwise beams have no phase difference and so the signal at 100 kHz at the output of photodetector 38 is zero. Therefore no feedback compensation is developed in lock-in amplifier 40, integrator 46 and voltage ramp generator 34, and thus no modulation is provided by the phase nulling modulator 32. However, if ring 26 is rotated, them will be a phase difference between the clockwise and counterclockwise optical beams. This causes a significant signal at 100 kHz at the output of photodetector 38 which passes through bandpass filter 42 and modulator 44 drives integrator 46 to operate voltage ramp generator 34 to deliver a compensating voltage to phase nulling modulator 32 and provide just the right amount of phase shift to cancel the phase difference between the clockwise and counterclockwise beams and bring the signal at 100 kHz at the output of photodetector 38 back to zero.

Figure 2:
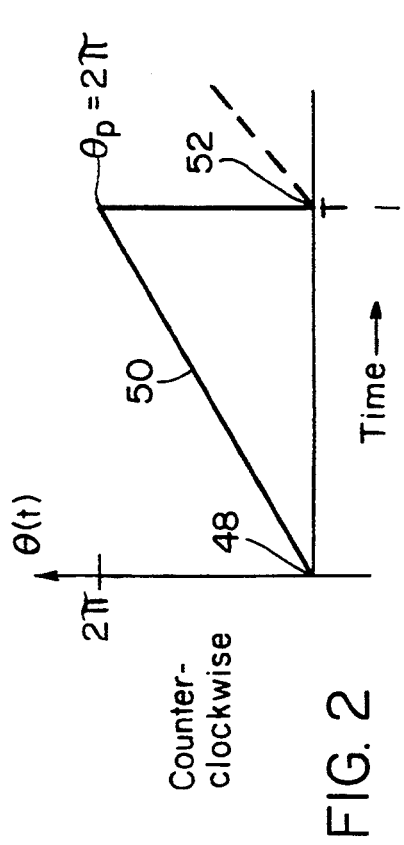
FIG. 2 is an illustration of the optical ramp phase waveform of the counterclockwise beam of FIG. 1 having an optimal peak phase amplitude of $2\pi$.

As indicated in the Background of Invention, supra, the voltage ramp generator 34 must be regularly reset to the beginning of the ramp and the best time to do this is when the ramp reaches a phase difference of $2\pi$, since any shifting by a factor of $2\pi$ in a sinusoidal or other periodic function will not be seen. The flyback sequence can better be understood from FIGS. 2, 3 and 4. In FIG. 2 the ordinate is phase $\theta(t)$ and the abscissa is time. The optical phase ramp 50 of the counterclockwise beam proceeds along until it reaches the optimal peak phase amplitude $\theta_p$ of $2\pi$. At that time, T, a flyback is instituted and the phase returns to zero as indicated at point 52. Since ring 26 in FIG. 1 is rotating, there is a phase difference between the clockwise and counterclockwise light beams. Since the optical fiber in ring 26 has significant length, the clockwise beam will require time $\tau$ after passing through phase nulling modulator 32 before being sensed by the photodetector 38. Thus the optical phase ramp 54, FIG. 3, of the clockwise beam, begins at its zero point 56 some time $\tau$ later than ramp 50. When ramp 54 reaches the optimal peak phase amplitude $\theta_p$ equal to $2\pi$ in FIG. 3, it flies back to zero at point 58.

Figure 3:
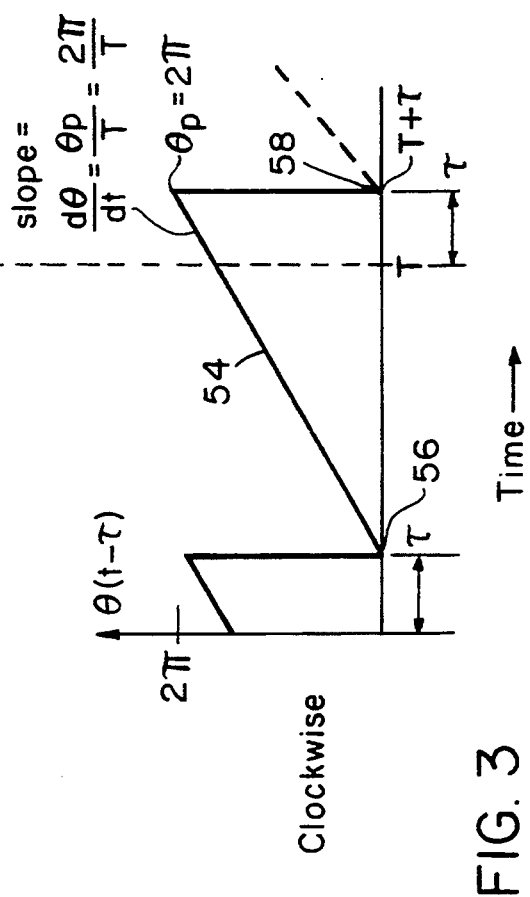
FIG. 3 is an illustration of the phase shifted optical ramp phase waveform of the clockwise beam of FIG. 1 having an optimal peak phase amplitude of $2\pi$.

The period between time T at 52 in FIG. 2 and the time T at point 58 in FIG. 3 is the transit time $\tau$ of ring 26. The slopes of ramps 50 and 54 are defined by $$\frac{d\theta}{dT} = \frac{\theta_p}{T} = \frac{2\pi}{T} \tag{1}$$

Figure 4:
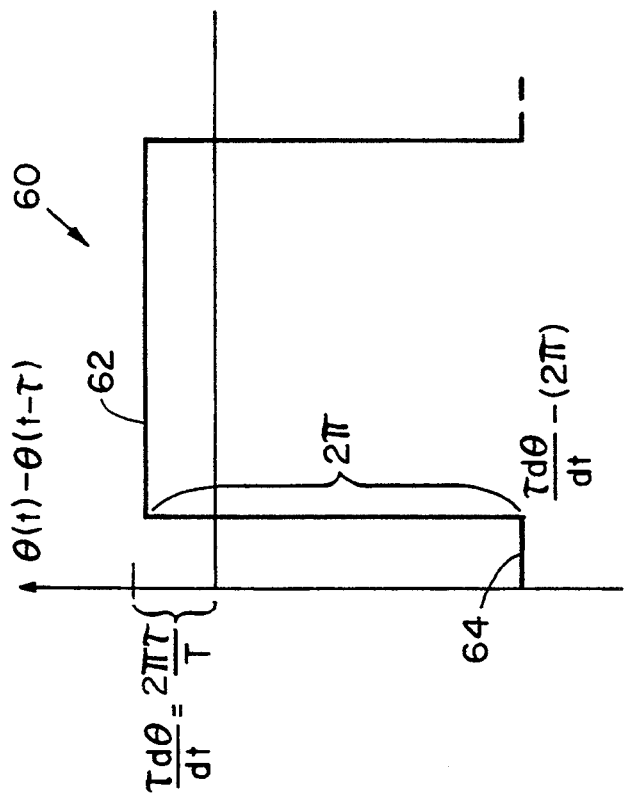
FIG. 4 is an illustration of a waveform representing the difference between the waveforms of FIGS. 2 and 3.

When the two waveforms in FIGS. 2 and 3 are differenced, the result is shown in FIG. 4 as waveform 60 which is equivalent to $\theta(t) - \theta(t-\tau)$.

The upper level 62 of waveform 60 is thus defined by:

$$\frac{\tau d\theta}{dT} = \frac{2\pi\tau}{T} \tag{2}$$

The lower level 64 is defined as:

$$\frac{\tau d\theta}{dT} - 2\pi = \frac{2\pi\tau}{T} - 2\pi \tag{3}$$

Thus the difference between the two levels is exactly $2\pi$ and always will be as long as the optimal peak phase amplitude is $2\pi$ in each case. However, due to various environmental causes such as temperature, aging, stress and the like, the gain of the lithium niobate waveguide modulator or phase nulling modulator 32 changes. That is, at two different times the same voltage will provide a different phase shift. This causes an error in the feedback loop so that the optimal peak phase amplitude will actually be $$2\pi + \delta \tag{4}$$

wherein $\delta$ is the error introduced by the drift in modulator 32.

Figure 5:
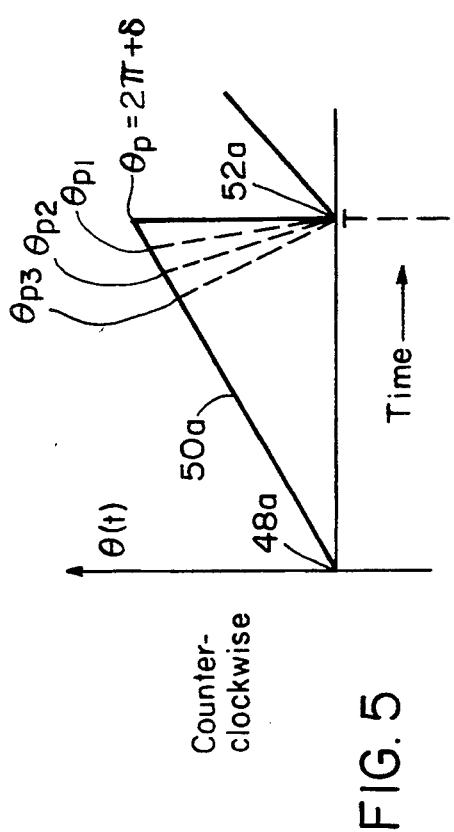
FIG. 5 is an illustration of the optical phase ramp of the counterclockwise beam in FIG. 1 where the peak phase amplitude is $2\pi$ plus an error of $\delta$.

In FIG. 5, counterclockwise beam optical phase ramp 50a is shown as reaching an optimal peak phase amplitude $$\theta_p = 2\pi + \delta \tag{5}$$

where $\delta$ is the error introduced by that drift. The clockwise beam likewise displays its optical phase ramp 54a, FIG. 6, with a peak phase amplitude $\theta_p$ of $2\pi + \delta$.

Now the slopes 50a and 54a can be defined by $$\frac{d\theta}{dT} = \frac{\theta_p}{T} = (2\pi + \delta)/T \tag{6}$$

Figure 7:
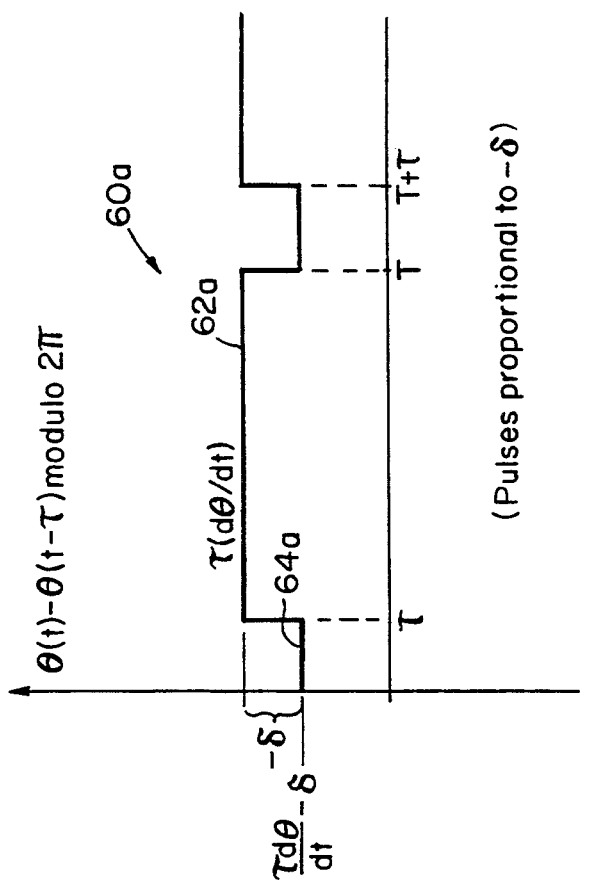
FIG. 7 illustrates a waveform representative of the difference between the waveforms of FIGS. 5 and 6.
Figure 6:
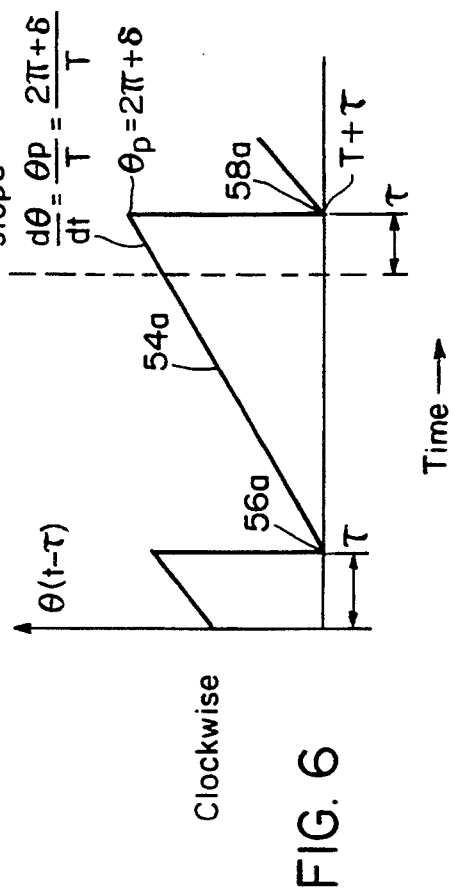
FIG. 6 is an illustration similar to FIG. 5 of the optical phase ramp of the clockwise beam of FIG. 1 where the peak phase amplitude is $2\pi$ plus an error of $\delta$.

When the waveforms of FIGS. 5 and 6 are differenced, the waveform 60a, FIG. 7, results, which is the function of $\theta(t) - \theta(t-\tau)$ modulo $2\pi$. It again has two levels, although these levels appear much closer together because the $2\pi$ difference, which the electronic system will not see anyway, has been removed by the modulo $2\pi$ approach. Now the upper level 62a has a value $\tau(d\theta/dT)$, while the lower level 64a has a value of $$\frac{\tau d\theta}{dT} - \delta \qquad (7)$$

Thus the difference in height between the two levels is precisely the error $\delta$. Underlying this invention then is the realization that if the signal is sampled during the differential flyback period, that is, the period $\tau$ as shown in FIG. 7, the signal obtained, $\delta$, will represent precisely the error in the peak phase amplitude relative to the optimal peak phase amplitude, which in this case is $2\pi$. This is so even though the flyback may be initiated at $\theta p1$, $\theta p2$, $\theta p3$, or some other point in order that the nonzero flyback time be accommodated so that by the time ramp 50 actually strikes point 52a, FIG. 5 for example, the ramp 50 would have reached its optimal peak phase amplitude $\theta_p$.

Figure 8:
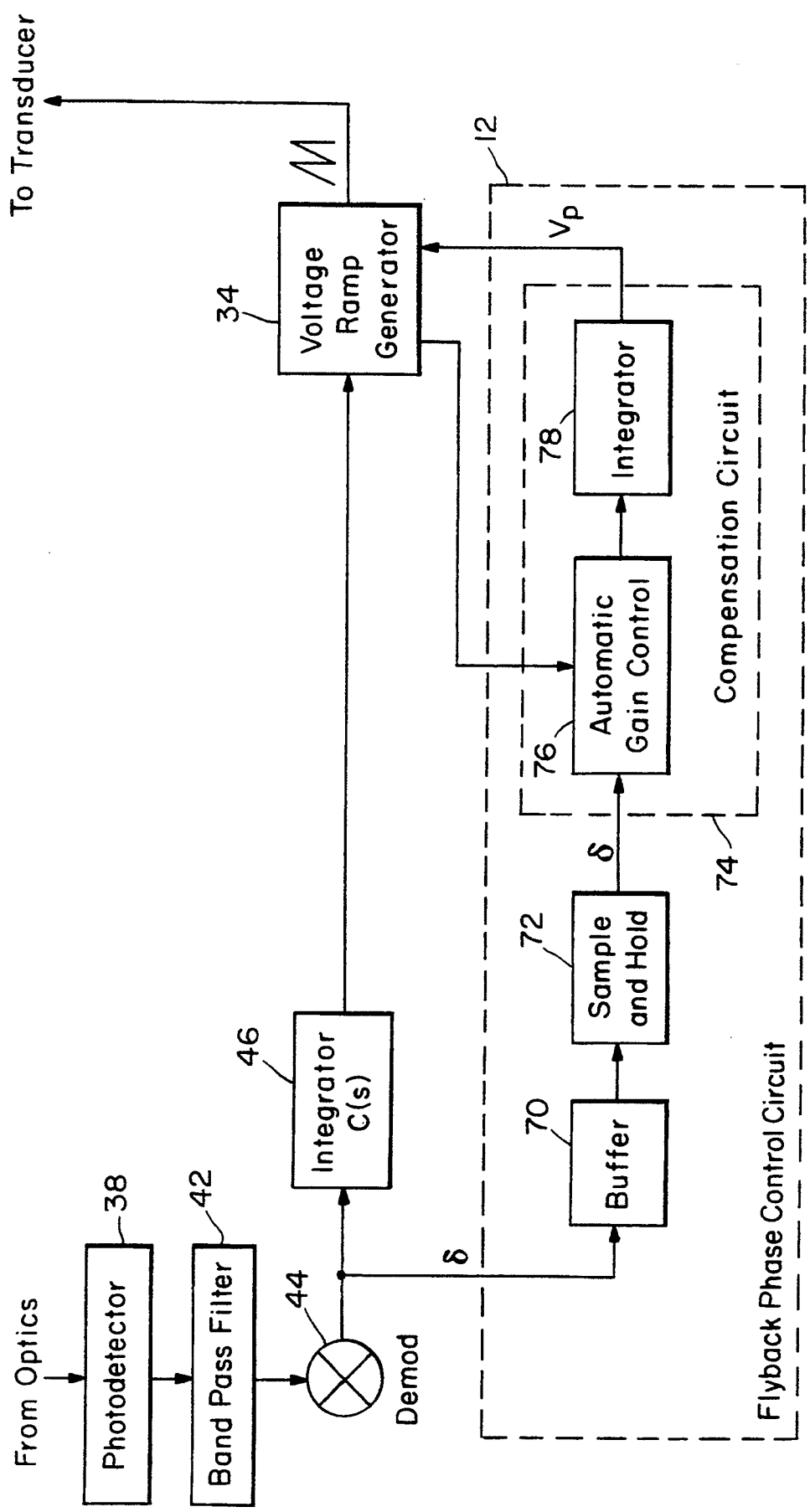
FIG. 8 is a more detailed schematic block diagram of the flyback phase control circuit of FIG. 1.

The correction of the error $\delta$ portrayed in FIG. 7, which reveals itself during the differential flyback period $\tau$, is accomplished with a flyback phase control circuit 12 according to this invention which includes a buffer amplifier 70, FIG. 8, that delivers the demodulated output from demodulator 44 to sample and hold circuit 72 which samples and holds the signal occurring only during the differential flyback period $\tau$. The signal $\delta$ sampled at that period is submitted to the compensation circuit 74 which includes an automatic gain control 76 and an integrator 78. The correction signal $V_p$ is submitted to voltage ramp generator 34 to slowly adjust for the drift in gain which by its nature is a slowly occurring drift as it is due to changes in temperature, aging, and similar generally slowly occurring environmental conditions.

Automatic gain control 76 monitors the voltage ramp generator 34 and sets the input to integrator 78 to zero if no flybacks have occurred for some predetermined period of time such as 0.3 seconds.

Although thus far the illustrations in FIGS. 2-7 dealt with positive-going optical phase ramps and positive errors $\delta$, this is not a necessary limitation of the invention. For example, as shown in FIG. 9 the counterclockwise beam optical phase ramp 80 is negative-going and has a peak phase amplitude $-\theta_p = -2\pi - \delta$. Similarly, clockwise beam has its optical phase ramp 82, FIG. 10, going negative to peak phase amplitude $-\theta_p = -2\pi - \delta$ shifted by $\tau$. Differencing the waveforms in FIGS. 9 and 10 results in waveform 84, FIG. 11, where it can be seen that the difference in the two levels, upper level 86 having a value of $\tau d\theta/dT + \delta$, and lower level 88 having a value of $\tau d\theta/dT$, is simply $+\delta$. If the error in the negative-going ramp shown in FIGS. 9 and 10 were a positive error, that is, $+\delta$, then the waveform 84 in FIG. 11 would have a $-\delta$ value. Likewise, if the positive-going ramp in FIGS. 5 and 6 had a negative $\delta$, waveform 60a in FIG. 7 would show a positive-going pulse to represent $\delta$.

Figure 12:
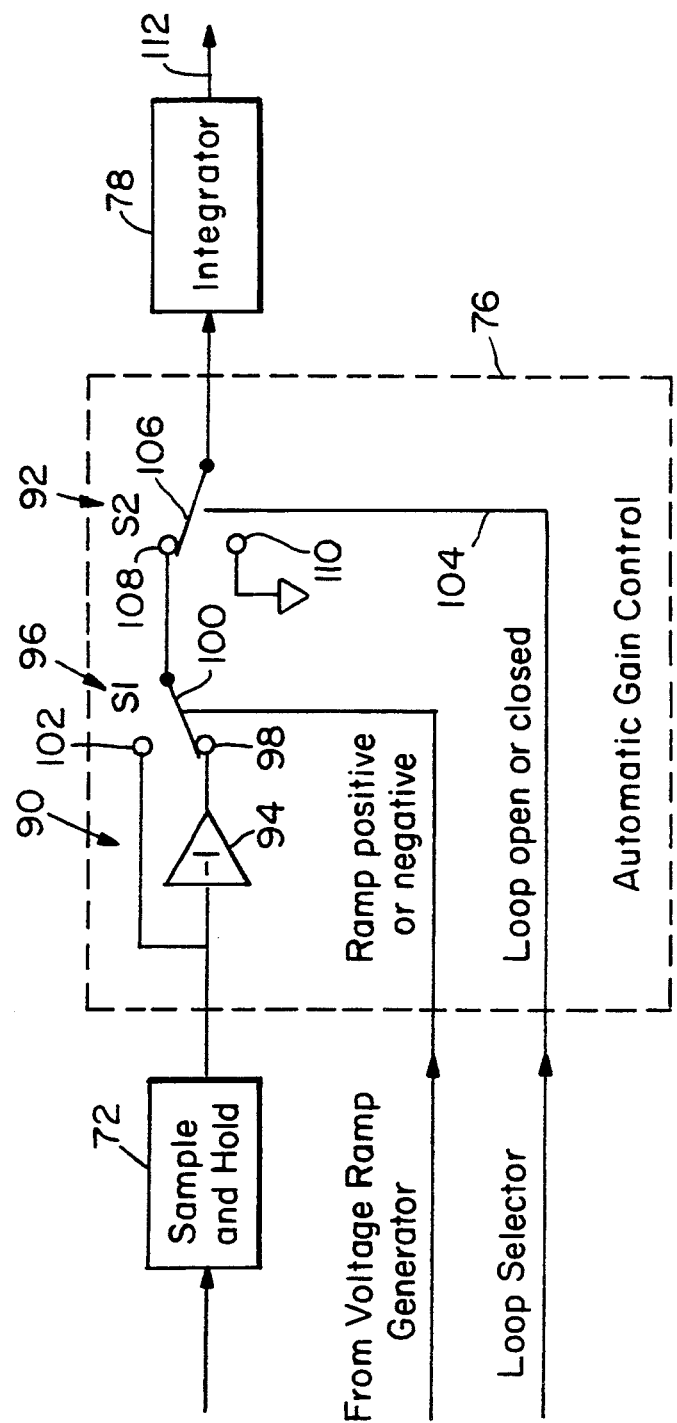
FIG. 12 is a more detailed schematic diagram of the automatic gain control of FIG. 8.

Automatic gain control 76, FIG. 12, includes an inverting circuit 90 and a loop select circuit 92. Inverter circuit 90 includes an inverting amplifier 94 and switch 96. Upon a signal from the voltage ramp generator indicating that the ramp is positive, switch 96 is placed in a position against contact 98 as shown in FIG. 12, for example. If the indication from voltage ramp generator 34 is a negative-going pulse, then the swinger 100 of switch 96 is moved to engage contact 102, for example. Loop selector circuit 92 also includes a switch which responds to an actuating signal on line 104 which normally engages swinger 106 with contact 108 providing a direct input to integrator 78. However, periodically, when there are no flybacks for a predetermined period of time, the loop selector signal on line 104 in voltage ramp generator 34 moves swinger 106 to engage contact 110, grounding the input to integrator 78 and returning it to zero in order to maintain the original value at output 112 until an update on the phase error is obtained at the next flyback.

Although specific features of this invention are shown in some drawings and not others, this is for convenience only as some feature may be combined with any or all of the other features in accordance with the invention.

Other embodiments will occur to those skilled in the art and are within the following claims:

What is claimed is:

1. A flyback compensated null seeking fiber optic gyroscope system comprising:
   a light source;
   a fiber optic ring;
   means, responsive to said light source, for producing a clockwise and counterclockwise light beam in said ring;
   means for detecting the phase difference between said clockwise and counterclockwise light beams;
   means for periodically modulating the phase of said light beams and for modulating the phase difference between said clockwise and counterclockwise light beams;
   ramp generator means, responsive to said means for detecting the phase difference, for generating a ramp signal having a predetermined optimal peak phase amplitude for adjusting said means for modulating to cancel the phase difference between said clockwise and counterclockwise beams induced by rotation of said ring;
   a flyback phase control circuit including a sample and hold circuit for sampling the phase difference between the clockwise and counterclockwise light beams in the differential flyback period of said ramp signal; and
   a compensation circuit, responsive to said sampled phase difference, for driving said ramp generator means to maintain the optimal peak phase amplitude.

2. The flyback compensated null seeking fiber optic gyroscope system of claim in which said light source is a laser.

3. The flyback compensated null seeking fiber optic gyroscope system of claim 1 in which said means for producing a clockwise and counterclockwise light beam includes a "Y" junction.

4. The flyback compensated null seeking fiber optic gyroscope system of claim 1 in which said means for detecting a phase difference includes a photodetector.

5. The flyback compensated null seeking fiber optic gyroscope system of claim 1 in which said means for detecting a phase difference includes a lock-in amplifier.

6. The flyback compensated null seeking fiber optic gyroscope system of claim 5 in which said lock-in amplifier includes a bandpass filter, amplifier and demodulator.

7. The flyback compensated null seeking fiber optic gyroscope system of claim 1 in which said ramp generator means includes a voltage ramp generator.

8. The flyback compensated null seeking fiber optic gyroscope system of claim 1 in which said compensation circuit includes an automatic gain control circuit and an integrator circuit responsive to said automatic gain control circuit.

9. The flyback compensated null seeking fiber optic gyroscope system of claim 8 in which said automatic gain control circuit includes an inverter circuit and means for interconnecting said inverter circuit with said sample and hold circuit when the ramp is of one polarity and disconnecting it when the ramp is of the other polarity.

10. The flyback compensated null seeking fiber optic gyroscope system of claim 9 in which said automatic gain control circuit includes switching means for setting the input of said integrator to zero when a flyback has not occurred for a predetermined period of time.

11. The flyback compensated null seeking fiber optic gyroscope system of claim 1 in which said gyroscope is an interferometric fiber optic gyroscope.

12. A flyback phase control circuit for a null seeking fiber optic gyroscope system having an optimal peak phase amplitude comprising:

a sample and hold circuit for sampling the phase difference between clockwise and counterclockwise optical beams, said sampling occurring during a differential flyback period; and a compensation circuit, responsive to the sampled phase difference, for driving a nulling phase modulator voltage ramp generator to maintain a predetermined optimal peak phase amplitude.

13. The flyback compensated null seeking fiber optic gyroscope system of claim 12 in which said compensation circuit includes an automatic gain control circuit and an integrator circuit responsive to said automatic gain control circuit.

14. The flyback compensated null seeking fiber optic gyroscope system of claim 13 in which said automatic gain control circuit includes an inverter circuit and means for interconnecting said inverter circuit with said sample and hold circuit when the ramp is of one polarity and disconnecting it when the ramp is of the other polarity.

15. The flyback compensated null seeking fiber optic gyroscope system of claim 13 in which said automatic gain control circuit includes switching means for setting the input of said integrator to zero when a flyback has not occurred for a predetermined period of time.

16. The flyback compensated null seeking fiber optic gyroscope system of claim 12 in which said gyroscope is an interferometric fiber optic gyroscope.

* * * * *